(12) United States Patent
Ryoo et al.

(10) Patent No.: US 11,847,632 B2
(45) Date of Patent: Dec. 19, 2023

(54) SOUND WAVE PAYMENT SYSTEM, MAGNETIC FIELD CONVERSION DEVICE, AND MOBILE TERMINAL FOR SOUND WAVE PAYMENT TECHNICAL FIELD

(71) Applicants: SHINHAN CARD CO., LTD., Seoul (KR); DANSOLPLUS CO., LTD., Seoul (KR)

(72) Inventors: Tae Hyun Ryoo, Seongnam-si (KR); Je Chul Lee, Seoul (KR); Chang Soon Yim, Seoul (KR); Mi Yeon Park, Seoul (KR); Su Won Lee, Seoul (KR)

(73) Assignees: DANSOLPLUS CO., LTD., Seoul (KR); SHINHAN CARD CO., LTD., Seoul (KR)

( * ) Notice: Subject to any disclaimer, the term of this patent is extended or adjusted under 35 U.S.C. 154(b) by 48 days.

(21) Appl. No.: 17/045,718

(22) PCT Filed: Apr. 8, 2020

(86) PCT No.: PCT/KR2020/004715
§ 371 (c)(1),
(2) Date: Oct. 6, 2020

(87) PCT Pub. No.: WO2021/096003
PCT Pub. Date: May 20, 2021

(65) Prior Publication Data
US 2022/0351178 A1    Nov. 3, 2022

(30) Foreign Application Priority Data

Nov. 13, 2019  (KR) .......................... 10-2019-0145264
Apr. 7, 2020    (KR) .......................... 10-2020-0042267

(51) Int. Cl.
G06Q 20/32    (2012.01)
G06F 3/16     (2006.01)

(52) U.S. Cl.
CPC ......... *G06Q 20/3272* (2013.01); *G06F 3/165* (2013.01)

(58) Field of Classification Search
CPC ............................ G06Q 20/3272; G06F 3/165
USPC ......................................... 235/375, 487–494
See application file for complete search history.

(56) References Cited

U.S. PATENT DOCUMENTS

2015/0150046 A1    5/2015  Maharajh et al.
2015/0254641 A1    9/2015  Bondesen et al.
2016/0247057 A1    8/2016  Lee et al.
2018/0195872 A1    7/2018  Bennett et al.
(Continued)

FOREIGN PATENT DOCUMENTS

JP      2016009375 A    1/2016
KR   10-2004-0082000 A  9/2004
KR   10-2016-0023750 A  3/2016
(Continued)

*Primary Examiner* — Jamara A Franklin
(74) *Attorney, Agent, or Firm* — BURNS & LEVINSON, LLP; Daniel W. Clarke; Bruce D. Jobse

(57) ABSTRACT

A mobile terminal converts token information corresponding to card information to a sound wave signal and transmits the sound wave signal to a magnetic field conversion device, and the magnetic field conversion device restores the token information from the received sound wave signal, converts the token information to a magnetic field signal, and transmits the magnetic field signal to a merchant terminal, to perform payment.

20 Claims, 16 Drawing Sheets

(56) References Cited

U.S. PATENT DOCUMENTS

2019/0362336 A1* 11/2019 Yim .................. G06Q 20/3278
2021/0067877 A1* 3/2021 Jeon ........................ H04S 1/007

FOREIGN PATENT DOCUMENTS

| KR | 10-2016-0044435 A | 4/2016 |
| KR | 10-2017-0098422 A | 8/2017 |
| KR | 10-1840013 B1 | 3/2018 |
| KR | 10-2018-0041432 B1 | 4/2018 |
| KR | 10-2019-0046250 A | 5/2019 |

* cited by examiner

SOUND WAVE PAYMENT SYSTEM, MAGNETIC FIELD CONVERSION DEVICE, AND MOBILE TERMINAL FOR SOUND WAVE PAYMENT TECHNICAL FIELD

RELATED APPLICATIONS

This application is a national stage application, filed under 35 U.S.C. § 371, of International Application No. PCT/KR2020/004715, filed on Apr. 8, 2020, which claims the benefit of priority under 35 U.S.C. § 119(e) to Korean Application No. 10-2019-0145264, filed on Nov. 13, 2019 and to Korean Application No. 10-2020-0042267, filed on Apr. 7, 2020, each of which is incorporated herein by reference in its entirety.

TECHNICAL FIELD

The following description relates to technology related to sound wave payment.

BACKGROUND ART

Existing sound wave payment technology operates based on hardware (H/W) embedded in specific smartphones, and may be thus used only in specific terminals provided by a specific H/W manufacturer.

As the mobile pay market using smartphones proliferates, various types of mobile pay apps are being provided, but the existing offline infrastructures are not properly utilized, which causes considerable inconvenience to services.

To overcome such an issue, a data transmission scheme through a contactless communication between a smartphone and an existing magnetic secure transmission (MST) payment terminal is being provided as a service. However, since a corresponding function may be used only in a specific terminal of a specific manufacturer, the data transmission scheme is not a perfect solution.

Thus, there is a need for technology that enables data transmission through a contactless communication with MST payment terminals in all types of various terminals in addition to a specific terminal of a specific manufacturer.

DETAILED DISCLOSURE OF INVENTION

Technical Solutions

According to an example embodiment, there is provided a mobile terminal including an inputter configured to receive a user input for selecting card information; a communicator configured to receive a token number indicating a physical card from a card company server, when a token issuance corresponding to card information selected by the user input is approved; a processor configured to generate token information including the token number and an identification code indicating a target service provider for identification of a service provider; and a sound wave outputter configured to output a sound wave signal converted from the generated token information and to transfer the sound wave signal to a magnetic field conversion device.

The processor may be configured to convert the token information to a sound wave signal based on a single data frame that includes a number of slots greater than or equal to a number count of the identification code and a number count of the token number.

In response to a volume level set in the sound wave outputter being less than or equal to a threshold volume level, the processor may be configured to increase the volume level of the sound wave outputter to a target volume level.

The processor may be configured to temporarily increase the volume level of the sound wave outputter to the target volume level and to restore the volume level of the sound wave outputter back to the original volume level.

The processor may be configured to maintain the volume level of the sound wave outputter at the target volume level during a time length including a period from an output start time of the sound wave signal to an output end time of the sound wave signal.

In response to at least a portion of a sound band of a sound source that is being reproduced by the sound wave outputter overlapping a sound band assigned to the sound wave signal, the processor may be configured to interrupt reproduction of the sound source.

In response to a sound band of a sound source that is being reproduced by the sound wave outputter not overlapping a sound band assigned to the sound wave signal, the processor may be configured to allow the sound source to continue to be reproduced. In response to the volume level being temporarily increased for output of the sound wave signal, the processor may be configured to limit a display output of an interface related to a volume control.

The processor may be configured to obtain device setting information including a device setting code, device setting data, and an identification code that indicates a target service provider. The sound wave outputter may be configured to output a sound wave signal converted from the device setting information to change device settings of the magnetic field conversion device.

The device setting data may include a setting value for at least one of a waiting time, a token transmission interval, a token transmission time length, a sound wave reception distance, a sound outputter setting value, a magnetic field generation interval per bit, a preamble, and a test mode.

According to an example embodiment, there is provided a magnetic field conversion device including a sound wave receiver configured to receive a sound wave signal to be output by a mobile terminal; a processor configured to convert token information to a series of binary values, in response to the received sound wave signal including the token information and an identification code of the token information indicating a target service provider assigned to the magnetic field conversion device; and a magnetic field outputter configured to generate a magnetic field signal in which a magnetic field direction is alternately changed, to perform payment based on the token information, in response to a supply of current corresponding to the series of binary values.

The sound wave receiver may be configured to receive a sound wave signal corresponding to the token information of a single data frame that includes a number of slots greater than or equal to a number count of the identification code and a number count of the token number.

The processor may be configured to convert a token number included in the token information to track data of a credit card and to convert the track data to the series of binary values.

The magnetic field outputter may include a coil including a ferrite core and a winding enclosing the ferrite core. The magnetic field conversion device may further include a power supply configured to provide a current pulse to the coil while alternately changing a current direction. The coil may be configured to generate a magnetic field signal of a magnetic field direction corresponding to the current direction in response to a supply of the current pulse.

The power supply may be configured to provide the current pulse to the coil at a first pulse interval with respect to a first bit value, and to provide the current pulse to the coil at a second pulse interval with respect to a second bit value.

The second pulse interval may be half of the first pulse interval.

The power supply may be configured to apply current pulses of opposite current directions to the coil at a start time and an end time of a period corresponding to the first bit value, and to disable the current pulses during a period between the start time and the end time. The power supply may be configured to apply a current pulse of a first current direction to the coil at a start time and an end time of a period corresponding to the second bit value, and to apply a current pulse of a second current direction opposite to the first current direction during a period between the start time and the end time.

The pulse width of the current pulse may be less than a pulse interval.

The magnetic field conversion device may be attachable to at least one of a merchant terminal and the mobile terminal.

In response to a device setting code being identified from the received sound wave signal, the processor may be configured to extract device setting data from the sound wave signal and to change device settings of the magnetic field conversion device based on the extracted device setting data.

BEST MODE FOR CARRYING OUT THE INVENTION

Figure 1:
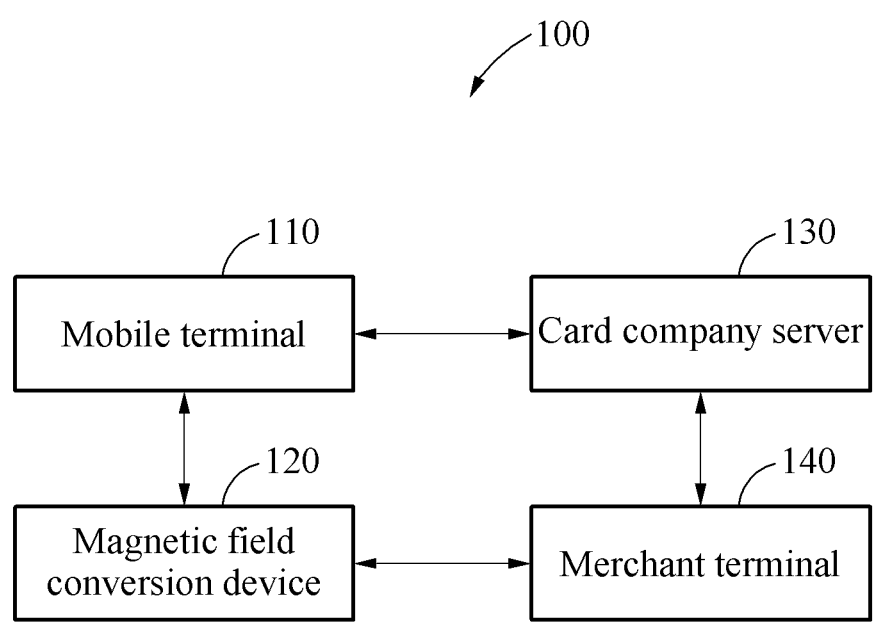
FIG. 1 illustrates a sound wave payment system according to an example embodiment.

Hereinafter, some example embodiments will be described in detail with reference to the accompanying drawings. The scope of the right, however, should not be construed as limited to the example embodiments set forth herein. Various modifications may be made to the example embodiments. Here, the example embodiments are not construed as limited to the disclosure and should be understood to include all changes, equivalents, and replacements within the idea and the technical scope of the disclosure.

The terminology used herein is for the purpose of describing particular example embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Regarding the reference numerals assigned to the elements in the drawings, it should be noted that the same elements will be designated by the same reference numerals, wherever possible, even though they are shown in different drawings. Also, in the description of example embodiments, detailed description of well-known related structures or functions will be omitted when it is deemed that such description will cause ambiguous interpretation of the present disclosure.

Also, the terms "first," "second," "A," "B," "(a)," "(b)," and the like may be used herein to describe components according to example embodiments. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, description made in one example embodiment may be applicable to another example embodiment and detailed description within a duplicate range is omitted.

FIG. 1 illustrates a sound wave payment system according to an example embodiment.

A sound wave payment system 100 according to an example embodiment may include a mobile terminal 110, a magnetic field conversion device 120, a card company server 130, and a merchant terminal 140.

The mobile terminal 110 may obtain token information corresponding to card information for payment, may convert the obtained token information to a sound wave signal, and may output the sound wave signal. The mobile terminal 110 may transfer the sound wave signal to the magnetic field conversion device 120.

The magnetic field conversion device 120 may receive the sound wave signal and may obtain the token information from the received sound wave signal. The magnetic field conversion device 120 may convert the token information to binary values, and may generate a magnetic field signal corresponding to the binary numbers. The magnetic field conversion device 120 may transfer the magnetic field signal to the merchant terminal 140.

The merchant terminal 140 may include a magnetic card reader, and may receive the magnetic field signal from the magnetic field conversion device 120 using the magnetic card reader. The merchant terminal 140 may decode the token information from the magnetic field signal, and may send a payment request to the card company server 130 based on the token information. The merchant terminal 140 may receive an approval result for the payment request from the card company server 130.

The card company server 130 may perform token issuance and payment verification. In an example, when user authentication of the mobile terminal 110 is successful, the card company server 130 may issue a token number corresponding to card information to the mobile terminal 110. In another example, when the payment request received from the merchant terminal 140 is valid, the card company server 130 may approve corresponding payment. In the present disclosure, the card company server 130 is described for convenience of description, however, there is no limitation thereto. For example, a server of a token issuer may be provided.

A distance enabling a sound wave communication between the mobile terminal 110 and the magnetic field conversion device 120 may be within 30 centimeters (cm), and a distance enabling a magnetic communication between the magnetic field conversion device 120 and a stripe reader head of the merchant terminal 140 may be within 5 cm. Operations of the mobile terminal 110, the magnetic field conversion device 120, the card company server 130, and the merchant terminal 140 will be described below.

Figure 2:
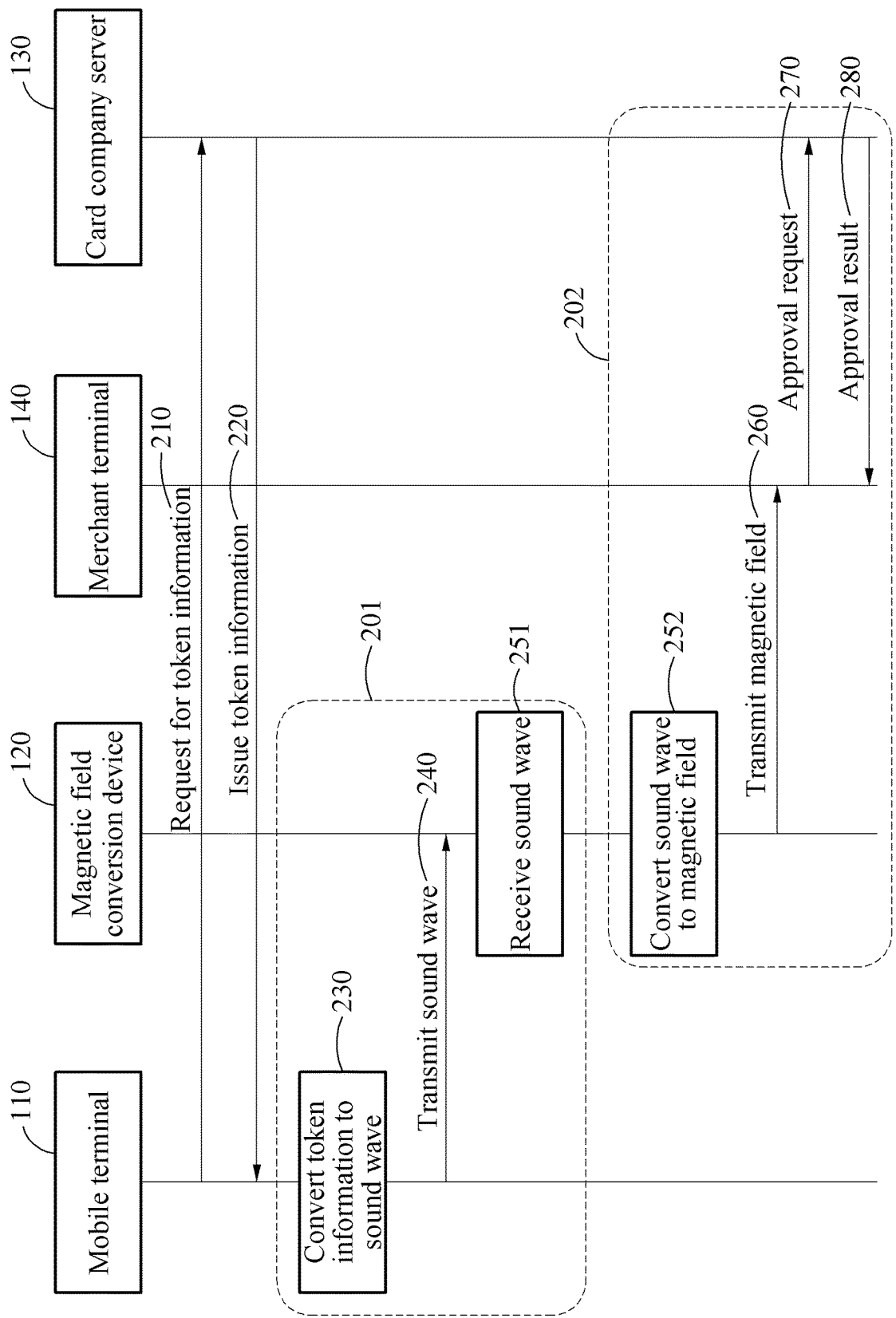
FIGS. 2 and 3 illustrate a sound wave payment method according to an example embodiment.
Figure 3:
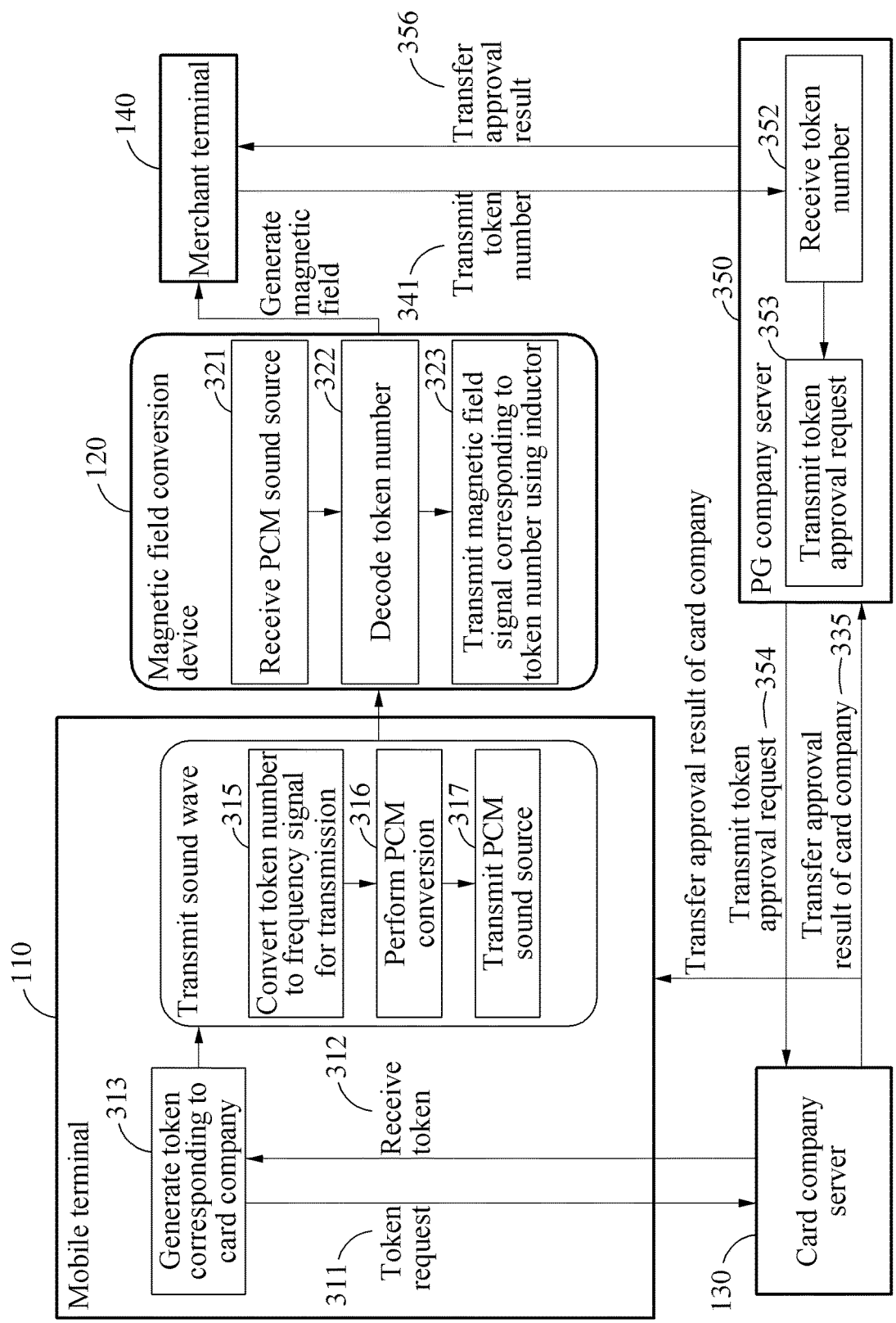

FIGS. 2 and 3 illustrate a sound wave payment method according to an example embodiment.

FIG. 2 schematically illustrates the sound wave payment method.

First, an application for supporting sound wave payment may be installed in a mobile terminal 110. The mobile terminal 110 may support a sound wave payment function using the application. For example, when the sound wave payment function is selected by a user during execution of the application, the mobile terminal 110 may initiate a sound wave payment process shown in FIG. 2.

In operation 210, the mobile terminal 110 may send a request for token information to a card company server 130. For example, the mobile terminal 110 may select card information corresponding to a token to be issued, and may request the card company server 130 to issue the token corresponding to the selected card information. When a plurality of pieces of card information are registered in a user account, the mobile terminal 110 may provide an interface for selecting the plurality of pieces of card information. The mobile terminal 110 may allow a user to select card information desired to use among the plurality of pieces of card information every payment. In this example, the mobile terminal 110 may perform user authentication, and the card company server 130 may issue a token in response to the user authentication being successful.

A token may be distinguished from an actual physical card. For example, a token number may be different from a serial number of an actual physical card, and may indicate a virtual card number indicating a physical card. In the present disclosure, a fixed payment token is mainly described as a token, however, there is no limitation thereto.

In operation 220, the card company server 130 may issue the token information. For example, when user authentication is successful, the card company server 130 may issue a token (for example, a fixed payment token) and may transmit the token to the mobile terminal 110.

The mobile terminal 110 and a magnetic field conversion device 120 may perform a sound wave conversion process 201, and the magnetic field conversion device 120 and a merchant terminal 140 may perform a magnetic field transmission process 202.

For example, in operation 230, the mobile terminal 110 may convert the token information to a sound wave signal. In operation 240, the mobile terminal 110 may transmit the sound wave signal. In operation 251, the magnetic field conversion device 120 may receive the sound wave signal.

In operation 252, the magnetic field conversion device 120 may convert the received sound wave signal to a magnetic field signal. For example, the magnetic field conversion device 120 may decode the token information from the received sound wave signal, and may convert the decoded token information to a magnetic field signal. In operation 260, the magnetic field conversion device 120 may transmit the magnetic field signal. In operation 270, the merchant terminal 140 may send an approval request for payment to the card company server 130. For example, the merchant terminal 140 may decode the token information from the magnetic field signal received from the magnetic field conversion device 120, and may request payment based on the decoded token information. In operation 280, the card company server 130 may determine whether to approve the payment based on validity of the decoded token information, and may notify the merchant terminal 140 of an approval result.

FIG. 3 illustrates the sound wave payment method in more detail.

In operation 311, the mobile terminal 110 may send a token request to the card company server 130. In operation 312, the mobile terminal 110 may receive a token from the card company server 130. In operation 313, the mobile terminal 110 may generate a token corresponding to a card company.

Here, the card company server 130 may distinguish tokens based on a mode code together with a token number. The mode code may be a code used in token issuance and payment approval using a token, and may be one of a token issuance code value indicating a communication between the mobile terminal 110 and the card company server 130, and a point of sales (POS) entry mode value indicating a communication between the merchant terminal 140 and the card company server 130. In operations 311 and 312, the mobile terminal 110 may transmit the token issuance code value as a mode code, together with the token number, and the card company server 130 may initiate a token issuance process in response to the token issuance code value being identified as a mode code.

The mobile terminal 110 may output a sound wave signal corresponding to token information. The token information may include an identification code together with a token number, which will be described below. For example, in operation 315, the mobile terminal 110 may convert a token number for transmission of a sound wave to a frequency signal for transmission. For example, the mobile terminal 110 may generate a frequency signal by assigning a frequency corresponding to a value (for example, a decimal value) for each slot of the token number. Different frequencies may be assigned to values of individual slots. Here, the mobile terminal 110 may generate a frequency signal for transmission by encoding the frequency signal. In operation 316, the mobile terminal 110 may perform pulse code modulation (PCM) conversion based on the generated frequency signal for transmission, to generate a PCM sound source. In operation 317, the mobile terminal 110 may output a sound wave signal by reproducing the generated PCM sound source.

In operation 321, the magnetic field conversion device 120 may receive the PCM sound source. For example, the magnetic field conversion device 120 may receive the sound wave signal from the mobile terminal 110. In operation 322, the magnetic field conversion device 120 may decode the token number from the sound wave signal. For example, the magnetic field conversion device 120 may decode the token information based on a frequency detected from the sound wave signal. In operation 323, the magnetic field conversion device 120 may transmit a magnetic field signal corresponding to the token number using an inductor (for example, a coil).

The merchant terminal 140 may receive the magnetic field signal from the magnetic field conversion device 120. The merchant terminal 140 may recognize and decode token information in the form of a magnetic field signal, using a magnetic card reader. In operation 341, the merchant terminal 140 may transmit the decoded token information to a payment gateway (PG) company server 350. For convenience of description, the PG company server 350 is described as an example, however, there is no limitation thereto. For example, a value-added network (VAN) company server may receive and transfer token information.

In operation 352, the PG company server 350 may receive the decoded token information from the merchant terminal 140. In operation 353, the PG company server 350 may request the card company server 130 to approve a token. In operation 354, the PG company server 350 may transmit a token approval request to the card company server 130. The card company server 130 may verify validity of the token number received from the PG company server 350. In operation 335, the card company server 130 may transfer an approval result of a card company to the PG company server 350 and the mobile terminal 110 based on a validity verification result. The card company server 130 may approve payment in response to the token number being valid, and may decline the payment in response to the token number being invalid. In operation 356, the PG company server 350 may transfer the approval result to the merchant terminal 140.

Here, the merchant terminal 140 may transfer a POS entry mode value as a mode code together with the token number to the card company server 130 via the PG company server 350. However, example embodiments are not limited thereto, and at least one of the merchant terminal 140 and the PG company server 350 may determine a type of transaction based on a code mode, and may request a token issuer to approve transaction. The card company server 130 may perform a payment approval process in response to the POS entry mode value being identified as a mode code.

Figure 4:
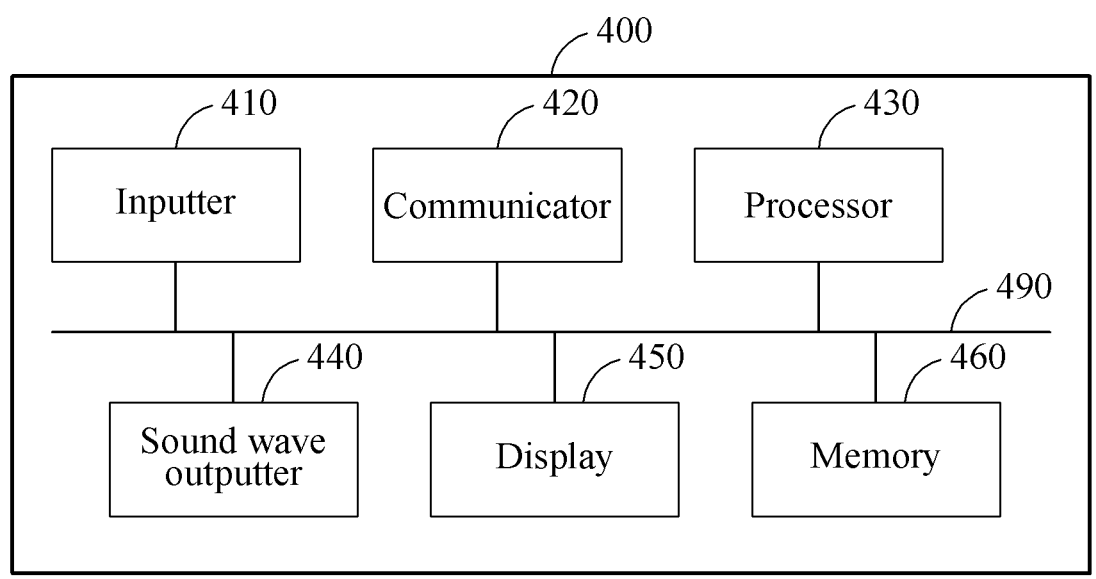
FIG. 4 is a block diagram illustrating a configuration of a mobile terminal according to an example embodiment.

FIG. 4 is a block diagram illustrating a configuration of a mobile terminal according to an example embodiment.

A mobile terminal 400 according to an example embodiment may include an inputter 410, a communicator 420, a processor 430, a sound wave outputter 440, a display 450, and a memory 460. The inputter 410, the communicator 420, the processor 430, the sound wave outputter 440, the display 450, and the memory 460 may perform a data communication using a communication bus 490.

The inputter 410 may receive a user input for selecting card information. For example, the inputter 410 may be integrated with the display 450 that will be described as a touch display 450 below, and may receive a touch input from a user, however, the inputter 410 is not limited thereto. The card information may be information indicating a physical card, and may include, for example, information about at least a portion of a serial number of the physical card.

The communicator 420 may receive a token number indicating a physical card from a card company server, when a token issuance corresponding to card information selected by the user input is approved. For example, the communicator 420 may request the card company server to issue a token, and may receive an issued token number.

The processor 430 may generate token information that includes a token number and an identification code indicating a target service provider for identification of a service provider. The token information will be further described below with reference to FIG. 6.

The sound wave outputter 440 may output a sound wave signal converted from the generated token information and may transfer the sound wave signal to a magnetic field conversion device. For example, the sound wave outputter 440 may reproduce a PCM sound source corresponding to a frequency signal converted from the token information. The sound wave outputter 440 may be a speaker.

The display 450 may output an interface for supporting a sound wave payment function. For example, the display 450 may display, to a user, a list of selectable card information, a progressing state of a payment process, and graphics objects indicating whether user authentication is successful and whether a sound wave is transmitted. An output of the display 450 will be described below with reference to FIG. 5.

The memory 460 may temporarily or semi-permanently store data required for sound wave transmission in the mobile terminal 400. For example, the memory 460 may store card information, token information, or device setting information.

Figure 5:
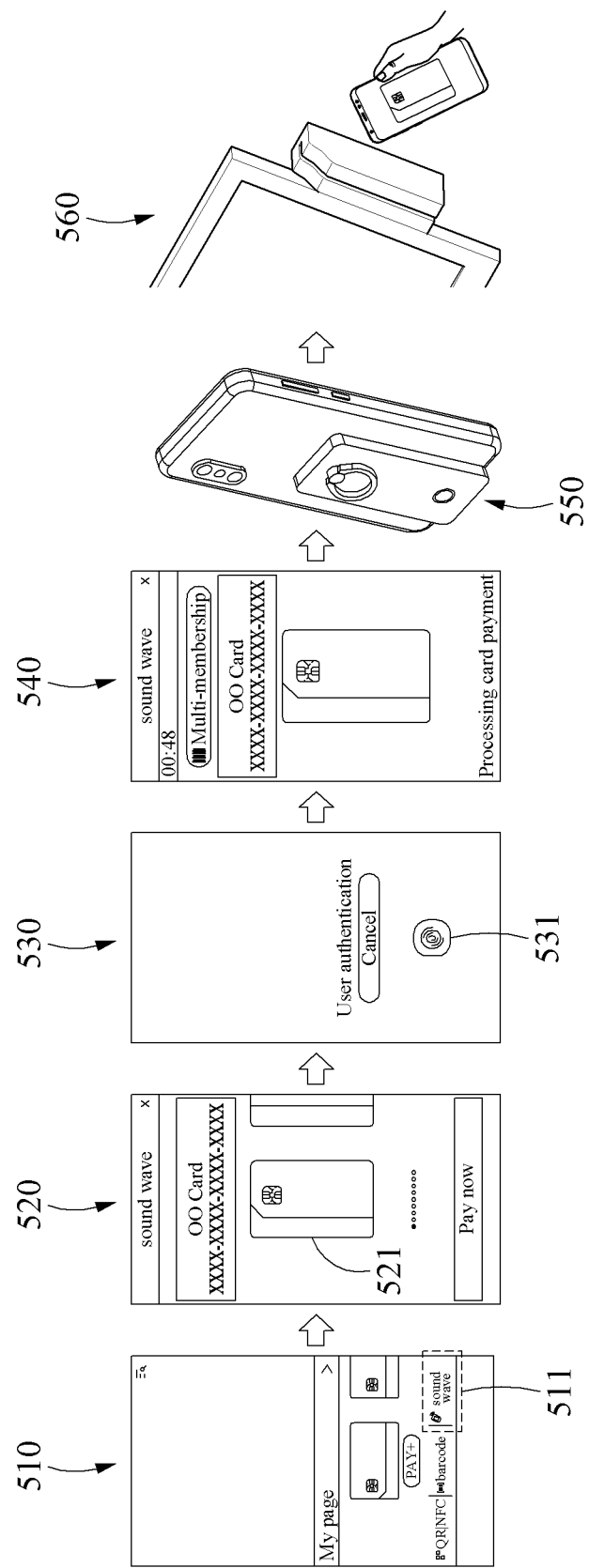
FIG. 5 is a diagram illustrating a sound wave transmission process in a mobile terminal according to an example embodiment.

FIG. 5 is a diagram illustrating a sound wave transmission process in a mobile terminal according to an example embodiment.

A display of the mobile terminal may provide an interface 510 for selecting a payment scheme. For example, when a user input for an object 511 indicating a sound wave payment function is acquired, the mobile terminal may proceed to a card selection interface 520. The display may visualize a list of card information selectable by a user in the card selection interface 520. When a user input for an object 521 indicating a piece of card information among one or more pieces of card information is acquired in the card selection interface 520, the mobile terminal may select the card information. The mobile terminal may request user authentication by outputting a user authentication interface 530 using the display. For example, the mobile terminal may output a biometric authentication object 531, to send a user authentication request to a user. When the user authentication is successful, the mobile terminal may perform sound wave conversion and transmission. The sound wave conversion and transmission have been described above, and thus further description thereof is omitted herein.

For example, the mobile terminal may output a sound wave transmission interface 540 using the display. The mobile terminal may intuitively guide the user that sound wave transmission is in progress. However, there is no limitation thereto, and the mobile terminal may restrict an exposure of the sound wave transmission interface 540 based on settings. When user authentication is successful, the mobile terminal may output a sound wave signal converted from token information during a set period of time.

A user may activate a magnetic field conversion device by pushing a power button 550 of the magnetic field conversion device. The activated magnetic field conversion device may recognize convertible information while monitoring ambient sound during a predetermined period of time (for example, 10 seconds). The magnetic field conversion device may receive the sound wave signal from the mobile terminal. The magnetic field conversion device may convert the sound wave signal to a magnetic field signal and may transfer the magnetic field signal to a merchant terminal 560.

Figure 6:
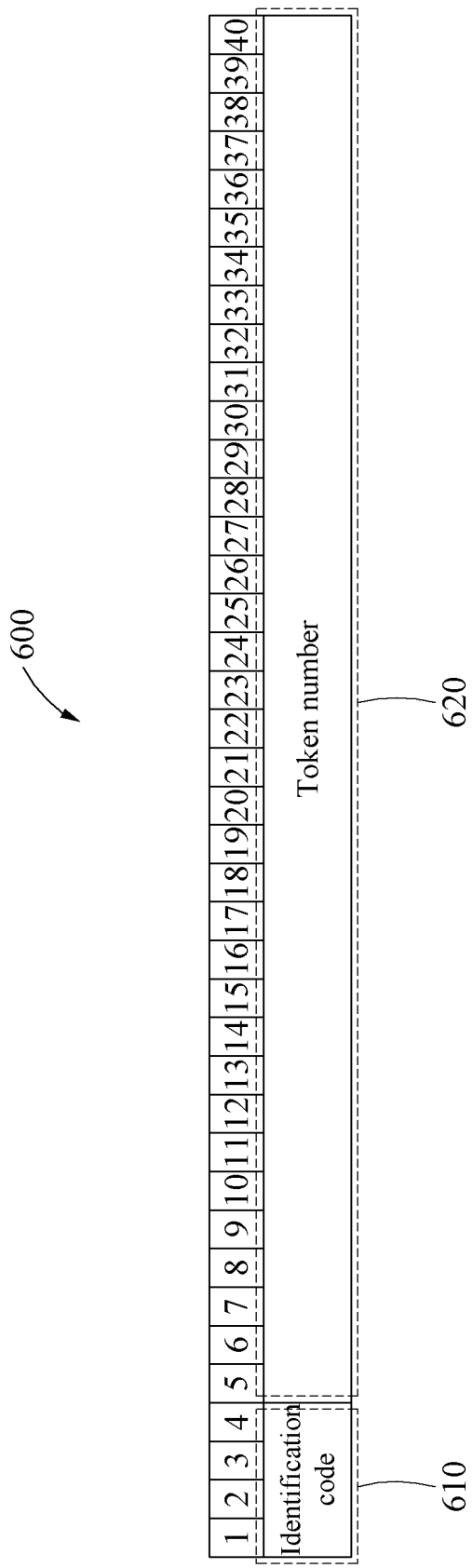
FIG. 6 is a diagram illustrating a data frame of token information according to an example embodiment.

FIG. 6 is a diagram illustrating a data frame of token information according to an example embodiment.

Token information 600 may include an identification code 610 and a token number 620. The token information 600 may include, but is not limited to, for example, a fixed token. The token information 600 may be implemented by a data frame including "n" slots. Here, "n" may be an integer greater than or equal to "1" and may be, for example, "40" in FIG. 6. Each slot of the token information 600 may include a value based on a decimal number. For example, each slot of the token information 600 may include an integer greater than or equal to "0" and less than or equal to "9". Each slot of the token information 600 may correspond to a byte. The token number 620 may be a series of values (for example, a serial number) indicating a physical card (for example, a magnetic card with a magnetic stripe), and may include a series of values different from a serial number of the physical card. The token number 620 may include "m" values, and "m" may be greater than or equal to "1" and less than or equal to "n". In FIG. 6, "m" may be "36". However, a number count in the token number 620 is not limited thereto, and may vary depending on a card company. In FIG. 6, a $5^{th}$ slot through a $40^{th}$ slot may be assigned to the token number 620.

The identification code 610 may be a code for distinguishing service providers from each other. For example, when "1111" is used as an identification code 610 for a company A, "2222" may be used as an identification code 610 for a company B. Thus, even in a situation in which sound wave signals are mixed by different service providers, the magnetic field conversion device may identify a sound wave signal by a target service provider. In FIG. 6, a $1^{st}$ slot through a $4^{th}$ slot may be assigned to the identification code 610.

A processor according to an example embodiment may convert the token information 600 based on a plurality of data frames. For example, the processor may convert the token information 600 by dividing the data frame into a first frame including a portion of the token number 620 and the identification code 610, and a second frame including the remaining portion of the token number 620. The first frame may include the $1^{st}$ slot through a $20^{th}$ slot, and the second frame may include a $21^{st}$ frame through the $40^{th}$ frame. However, example embodiments are not limited thereto.

When a token value provided by an arbitrary card company has a length less than that of the first frame, a 1-byte blank may be recognized as 0, which may cause identification as a completely different card. Thus, a phenomenon in which processing is impossible may occur. When the token information 600 is converted using a single data frame, which will be described below, the phenomenon may be prevented.

The processor may convert the token information 600 to a sound wave signal based on a single data frame that includes a number of slots greater than or equal to a number count of the identification code 610 and a number count of the token number 620. In FIG. 6, the number of slots in the single data frame may correspond to a sum of the number count of the identification code 610 and the number count of token number 620, however, example embodiments are not limited thereto. The data frame may further include information indicating a start of data and information indicating an end of data before and after the identification code 610 and the token number 620.

Figure 7:
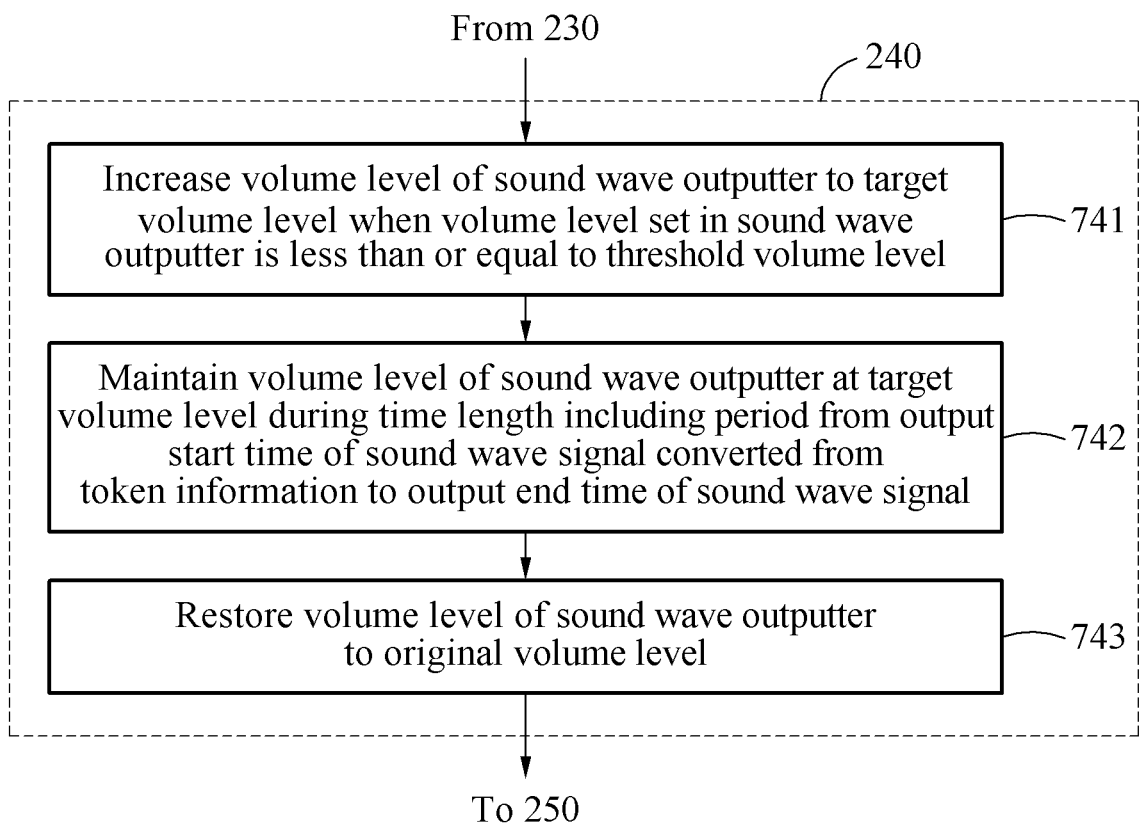
FIG. 7 is a flowchart illustrating a volume control method according to an example embodiment.

FIG. 7 is a flowchart illustrating a volume control method according to an example embodiment.

In operation 741, a processor of a mobile terminal increases volume level of a sound wave outputter to a target volume level, when a volume level set in the sound wave outputter is less than or equal to a threshold volume level. The threshold volume level may be, for example, a value indicating a mute state. The target volume level may be a value exceeding the threshold volume level. Thus, even when the mobile terminal is muted by a user, the mobile terminal may transfer a sound wave signal converted from token information to a magnetic field conversion device without an additional operation.

In operation 742, the processor maintains the volume level of the sound wave outputter at the target volume level during a time length including a period from an output start time of the sound wave signal converted from the token information to an output end time of the sound wave signal.

When at least a portion of a sound band of a sound source being reproduced by the sound wave outputter overlaps a sound band assigned to the sound wave signal, the processor may interrupt reproduction of the sound source. When the sound band of the sound source being reproduced by the sound wave outputter does not overlap the sound band assigned to the sound wave signal, the processor may allow the sound source to continue to be reproduced. Thus, the mobile terminal may output a sound wave signal for payment, without interfering with a current work by a user. However, example embodiments are not limited thereto. For example, when a sound source being reproduced by the sound wave outputter is present regardless of a band, the processor may interrupt reproduction of the sound source during transmission of sound waves.

In operation 743, the processor temporarily increases the volume level of the sound wave outputter to the target volume level, and restores the volume level to the original volume level. Thus, the mobile terminal may provide a volume level set by a user with convenience, instead of performing an additional operation. Also, when the output of the sound wave signal converted from the token information ends, the processor may resume reproduction of the sound source that is interrupted.

Also, the processor may limit a display output of an interface related to a volume control when temporarily increasing the volume level for an output of the sound wave signal. Thus, the mobile terminal may automatically adjust the volume level without interfering with a current work of a user. Also, the mobile terminal may measure an ambient noise level and may determine the above-described target volume level based on the ambient noise level.

Figure 8:
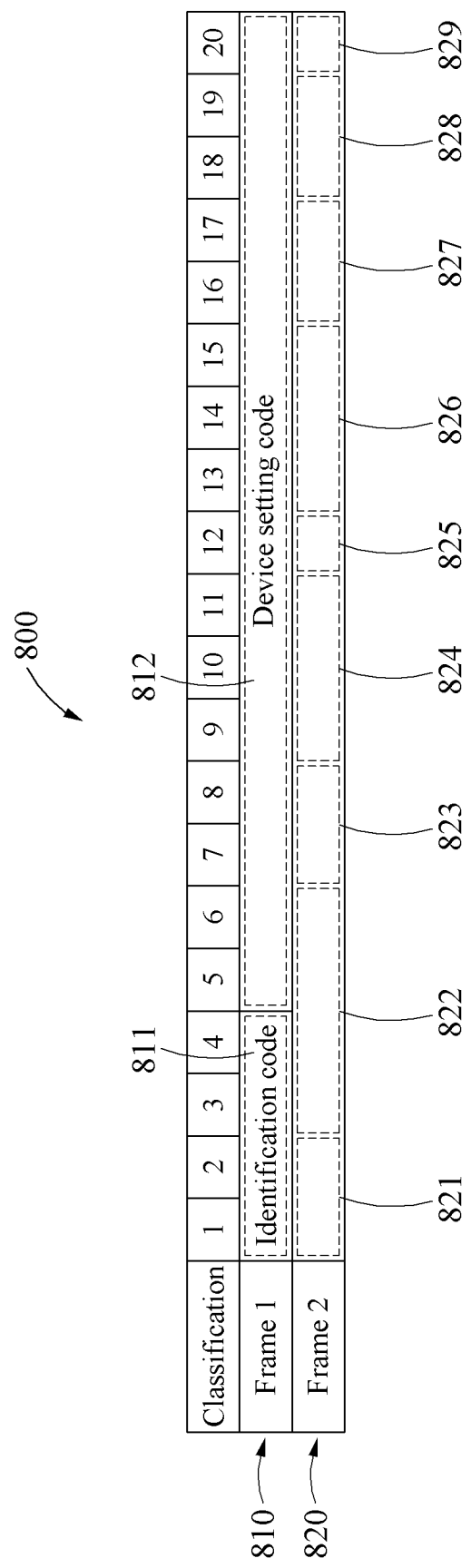
FIG. 8 is a diagram illustrating a data frame of device setting information according to an example embodiment.

FIG. 8 is a diagram illustrating a data frame of device setting information according to an example embodiment.

A mobile terminal according to an example embodiment may obtain device setting information, may convert the device setting information to a sound wave signal, and may output the sound wave signal. For example, a sound wave outputter of the mobile terminal may output a sound wave signal converted from device setting information for changing device settings of a magnetic field conversion device. When a sound wave signal including device setting information 800 is received, the magnetic field conversion device may change the device settings.

The magnetic field conversion device may operate based on default device settings stored in firmware. When the above-described device setting information is received, the magnetic field conversion device may change its own device settings. For example, the magnetic field conversion device may adjust a service policy and settings to adjust a reception distance based on a user's preference or to turn off beep sound, or may adjust a magnetic field generation interval. When maintenance and modification are required, a user and/or a service provider may modify firmware settings of the magnetic field conversion device based on the device setting information. For example, when an application installed in the mobile terminal is updated by a service provider to comply with changes in laws and regulations, the service provider may update a plurality of magnetic field conversion devices using a plurality of mobile terminals even though the magnetic field conversion device is directly updated.

The device setting information may be information to set the magnetic field conversion device, and may include an identification code 811, a device setting code 812, and device setting data. As described above, the token information and the device setting information may be represented as data frames of the same format. The data frames are classified into a first frame 810, 810 and a second frame 820, 820, as shown in FIG. 8, however, example embodiments are not limited thereto. The device setting information may also be implemented by a single data frame.

The identification code 811 may be an identifier to identify a service provider as described above, and may include a value indicating a target service provider. The target service provider may represent a sound wave payment application installed in the mobile terminal, and a service provider that may be supported by the magnetic field conversion device.

The device setting code 812 may be a value indicating that a data frame includes data about device settings. The magnetic field conversion device may identify information included in the data frame as one of token information and device setting information based on the device setting code 812. For example, when a series of values included in slots (for example, a $5^{th}$ slot through a $20^{th}$ slot) in a predetermined section in the data frame match the device setting code 812, the magnetic field conversion device may determine that the data frame includes data about the device setting information.

The device setting data may include a setting value for at least one of a waiting time, a token transmission interval, a token transmission time length, a sound wave reception distance, a sound outputter setting value, a magnetic field generation interval per bit, a preamble, and a test mode. In the following description, first setting data 821 through ninth setting data will be described as device setting data.

The first setting data 821 may be data for setting a sound wave reception waiting time. The sound wave reception waiting time may refer to a time required to wait for sound wave reception after the magnetic field conversion device is operated. The sound wave reception waiting time may be set to a value greater than or equal to "10" and less than or equal to "99" and measured in seconds.

Second setting data 822 may be data for setting a token transmission interval. The token transmission interval may refer to an interval at which transmission of a magnetic field signal corresponding to token information is repeated. The token transmission interval may be set to a value greater than or equal to "500" and less than or equal to "9999" and measured in milliseconds (ms). When the second setting data 822 is set to "1000", the magnetic field conversion device may repeatedly transmit a magnetic field signal corresponding to a token number at each time interval of 1 s.

Third setting data 823 may be data for setting a token transmission time length. The token transmission time length may refer to a total time length during which the magnetic field conversion device transmits a magnetic field signal. The token transmission time length may be set to a value greater than or equal to "10" and less than or equal to "99" and measured in seconds. When the third setting data 823 is set to "10" and when the second setting data 822 is set to "1000", magnetic field signals may be transmitted at each time interval of 1 s for 10 s.

Fourth setting data 824 may be data for setting a sound wave reception distance. The sound wave reception distance may refer to a distance that allows a sound wave signal to be received from a sound wave outputter of the mobile terminal by the magnetic field conversion device. The sound wave reception distance may be set to a value greater than or equal to "100" and less than or equal to "500" and measured in millimeters (mm). According to an example embodiment, in a sound wave communication, a microphone of the magnetic field conversion device may receive a sound wave signal when an output of a speaker of the mobile terminal increases since there is no separate pairing operation. For example, when an output is performed by setting a volume level of a smartphone to a maximum level (for example, "100"), a distance enabling reception of a signal from a sound wave outputter (for example, a speaker) of the mobile terminal may need to be set. The sound wave reception distance may be obtained by converting a sound wave strength (for example, in decibels) of a sound wave signal received by a sound wave receiver (for example, a microphone) of the magnetic field conversion device into a distance. The magnetic field conversion device may convert the sound wave strength of the received sound wave signal to a current reception distance, may compare the current reception distance to a device setting value (for example, a minimum reception distance) that is set in advance, and may exclude the sound wave signal in response to the current reception distance being less than or equal to the minimum reception distance.

Fifth setting data 825 may be data for setting a sound outputter setting value (for example, on or off) of the magnetic field conversion device. The fifth setting data 825 may include "1" as a value to turn on the sound outputter and "0" as a value to turn off the sound outputter. Depending on user's settings, beep sound may be turned on or off.

Sixth setting data 826 may be data for setting a magnetic field generation interval per bit. Token information received by the magnetic field conversion device may be converted to a binary number based on track 2 data, which will be described below. The magnetic field generation interval per bit may refer to a magnetic field generation interval corresponding to each bit value of the binary number. The magnetic field generation interval will be described below with reference to FIG. 11. A countless number of types of POS terminals may be installed in a merchant. Merchant terminals may include older-type terminals failing to perform recognition due to a low recognition speed of a reader. In this example, fine adjustment of a gap may be required.

Seventh setting data 827 and eighth setting data 828 may be data for setting a preamble. The seventh setting data 827 may be used to set a start preamble that may be recognized by a magnetic card reader, and the eighth setting data 828 may be used to set an end preamble.

The ninth setting data 829 may be data for setting a test mode. A value to enter a quality check (QC) mode may be "1", and a value to enter a normal mode may be "0".

As described above, the mobile terminal may change device settings of the magnetic field conversion device based on a sound wave. The mobile terminal may generate a sound wave signal associated with device setting information, and may output the sound wave signal. In response to reception of the sound wave signal associated with the device setting information, the magnetic field conversion device may reflect the device setting information. Thus, the mobile terminal may provide device settings for the magnetic field conversion device with convenience, even though there is no pairing between the magnetic field conversion device and a communication module, for example, a wireless fidelity (Wi-Fi) or Bluetooth. In particular, since an additional communication module is not required for the magnetic field conversion device, the magnetic field conversion device may be miniaturized at a lower unit cost.

Figure 9:
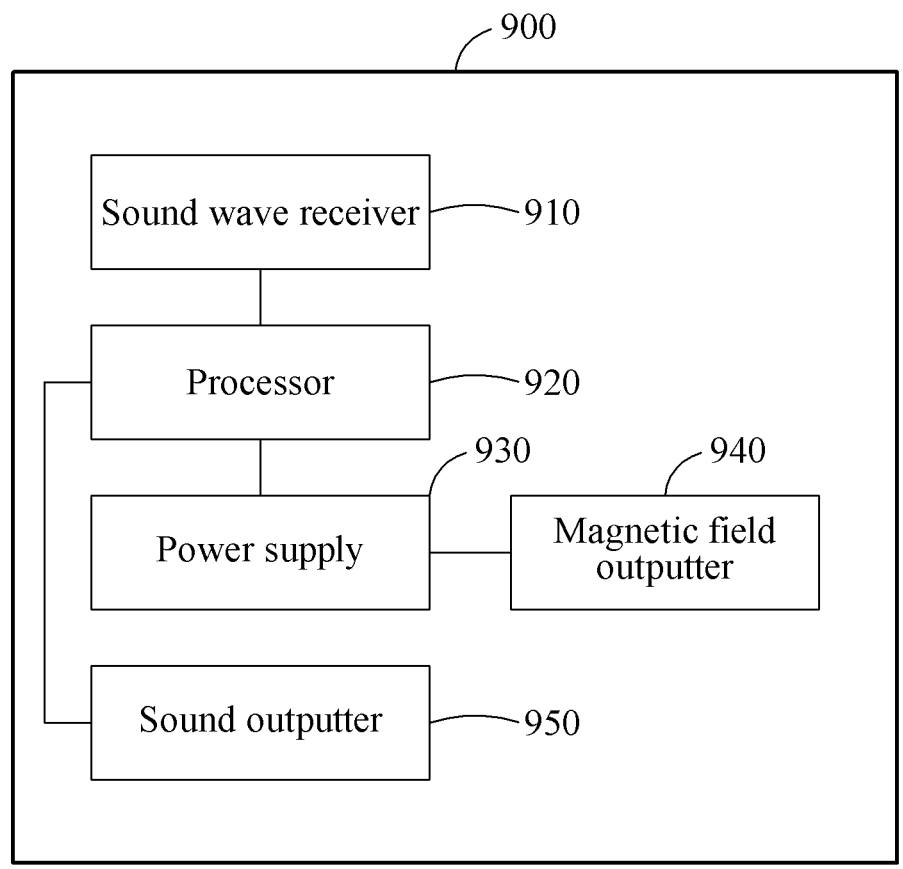
FIG. 9 is a block diagram illustrating a configuration of a magnetic field conversion device according to an example embodiment.

FIG. 9 is a block diagram illustrating a configuration of a magnetic field conversion device according to an example embodiment.

A magnetic field conversion device 900 according to an example embodiment may include a sound wave receiver 910, a processor 920, a power supply 930, a magnetic field outputter 940, and a sound outputter 950.

The sound wave receiver 910 may receive a sound wave signal output by a mobile terminal. The sound wave receiver 910 may include, for example, a microphone. The sound wave receiver 910 may receive a sound wave signal corresponding to token information of a single data frame including a number of slots greater than or equal to a number count of a token number and a number count of an identification code.

The processor 920 may convert token information to a series of binary values in response to the received sound wave signal including the token information and an identification code of the token information indicating a target service provider assigned to the magnetic field conversion device 900. When the sound wave signal includes token information, the processor 920 may perform binary conversion of the token information. When an identification code of token information matches a target code (for example, a code indicating the target service provider) supported by the magnetic field conversion device 900, the processor 920 may perform binary conversion of the token information. Thus, the magnetic field conversion device 900 may perform binary conversion of token information provided by a desired service provider, not other token information. Binary conversion will be described below with reference to FIG. 12.

When a device setting code is identified from the received sound wave signal, the processor 920 may extract device setting data from the sound wave signal and may change device settings of the magnetic field conversion device 900 based on the extracted device setting data. For example, the processor 920 may determine whether a device setting code included in a sound wave signal matches a device setting code defined in advance between the mobile terminal and the magnetic field conversion device 900. Thus, the processor 920 may determine whether to change the device settings based on whether the device setting codes match, even though there is no separate pairing.

The power supply 930 may supply power to the magnetic field outputter 940. The power supply 930 may provide a current pulse to the magnetic field outputter 940, to induce magnetic field generation by the magnetic field outputter 940. An operation of the power supply 930 will be described below with reference to FIGS. 13 and 14.

The magnetic field outputter 940 may generate a magnetic field signal in which a magnetic field direction is alternately changed, to perform payment based on the token information, in response to a supply of current corresponding to the series of binary values.

The sound outputter 950 may output information associated with sound wave reception and magnetic field conversion, as a sound signal. For example, when a sound wave signal received from the mobile terminal includes token information and when the token information is valid, the magnetic field conversion device 900 may output a reception beep sound indicating that normal information is received through the sound outputter 950.

Figure 10:
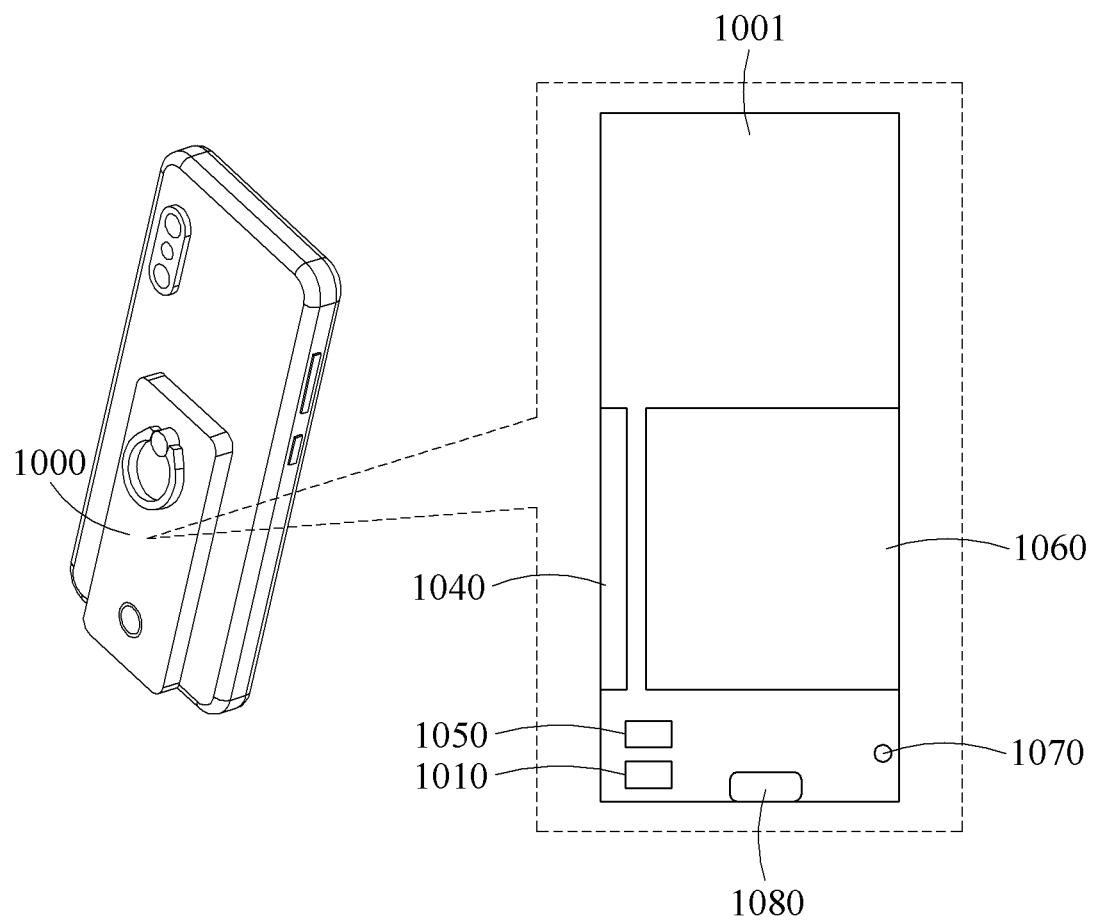
FIG. 10 is a diagram illustrating an internal arrangement of a magnetic field conversion device according to an example embodiment.

FIG. 10 is a diagram illustrating an internal arrangement of a magnetic field conversion device according to an example embodiment.

Referring to FIG. 10, a magnetic field conversion device 1000 according to an example embodiment may be attached to one surface (for example, a rear surface) of a mobile terminal. The magnetic field conversion device 1000 may accommodate a plurality of circuit elements in a housing. For example, a microphone 1010, a coil 1040, a speaker 1050, a battery 1060, a power button 1070, and a wired charging terminal 1080 may be arranged on one surface of a substrate 1001. On an opposite surface of the substrate 1001, an inductor to wirelessly receive power for charging the battery 1060 may be disposed. Thus, the magnetic field conversion device 1000 may perform sound wave reception and magnetic field conversion within a restricted form factor. Hereinafter, generation of a strong magnetic field signal by a coil disposed in a restricted form factor will be described.

Figure 11:
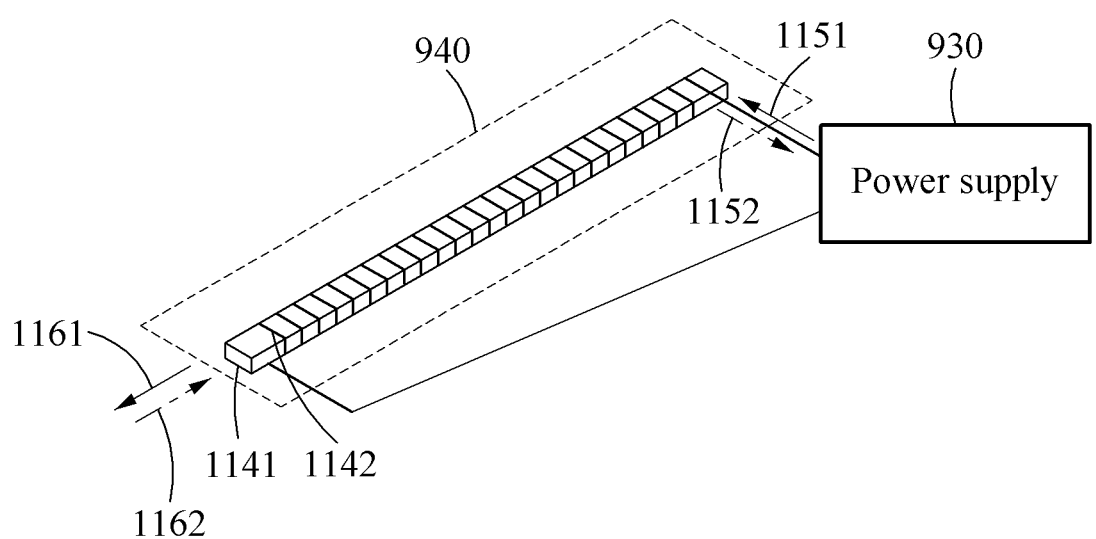
FIG. 11 is a diagram illustrating a magnetic field outputter according to an example embodiment.

FIG. 11 is a diagram illustrating a magnetic field outputter according to an example embodiment.

A magnetic field outputter 940 according to an example embodiment may be implemented as, for example, a magnetic field generation coil. For example, the magnetic field generation coil may include a magnetic coil 1141 (hereinafter, referred to as a "coil") having a ferrimagnetic characteristic, and a winding 1142 enclosing the core 1141.

The core 1141 may be a ferrite core. The core 1141 may have a columnar shape, for example, a cylindrical shape or a polygonal columnar shape. The winding 1142 may be a conductive wire. The winding 1142 may be disposed to enclose an outer surface of the core 1141 having a columnar shape. In the magnetic field generation coil, a magnetic shield may not be used. The magnetic field generation coil may amplify a magnetic field signal generated in the winding 1142 due to a ferrimagnetic characteristic of ferrite. For example, the magnetic field generation coil may amplify a magnetic field signal generated by the winding 1142 500 times or greater. The magnetic field generation coil may be, for example, an inductor having an inductance value of 185 uH to 200 uH. The core 1141 may be accommodated in the magnetic field conversion device 1000 of FIG. 10 within the restricted form factor so that a longitudinal direction of the housing and a longitudinal direction of the core 1141 may be parallel. Thus, the magnetic field generation coil may have the above-described inductance value even within the restricted form factor.

A power supply 930 of a magnetic field conversion device may provide a current pulse to a coil while alternately changing a current direction. For example, the power supply 930 may supply power with current of 30 mA at voltage of 1.5 V to 3.3 V to the above-described magnetic field generation coil. For example, the power supply 930 may alternately change current corresponding to a bit value of a received token number at each time interval of 100 to 150 microseconds and may supply power to the magnetic field generation coil.

In response to a supply of the current pulse, the coil may generate a magnetic field signal of a magnetic field direction corresponding to a current direction. In an example, the power supply 930 may supply a current pulse to the winding 1142 in a first current direction 1151. In this example, a magnetic field signal of a first magnetic field direction 1161 may be induced by the winding 1142. In another example, the power supply 930 may supply a current pulse to the winding 1142 in a second current direction 1152. In this example, a magnetic field signal of a second magnetic field direction 1162 may be induced by the winding 1142. One of the first magnetic field direction 1161 and the second magnetic field direction 1162 may correspond to an N pole direction of a magnet and the other one may correspond to an S pole direction of the magnet.

Figure 12:
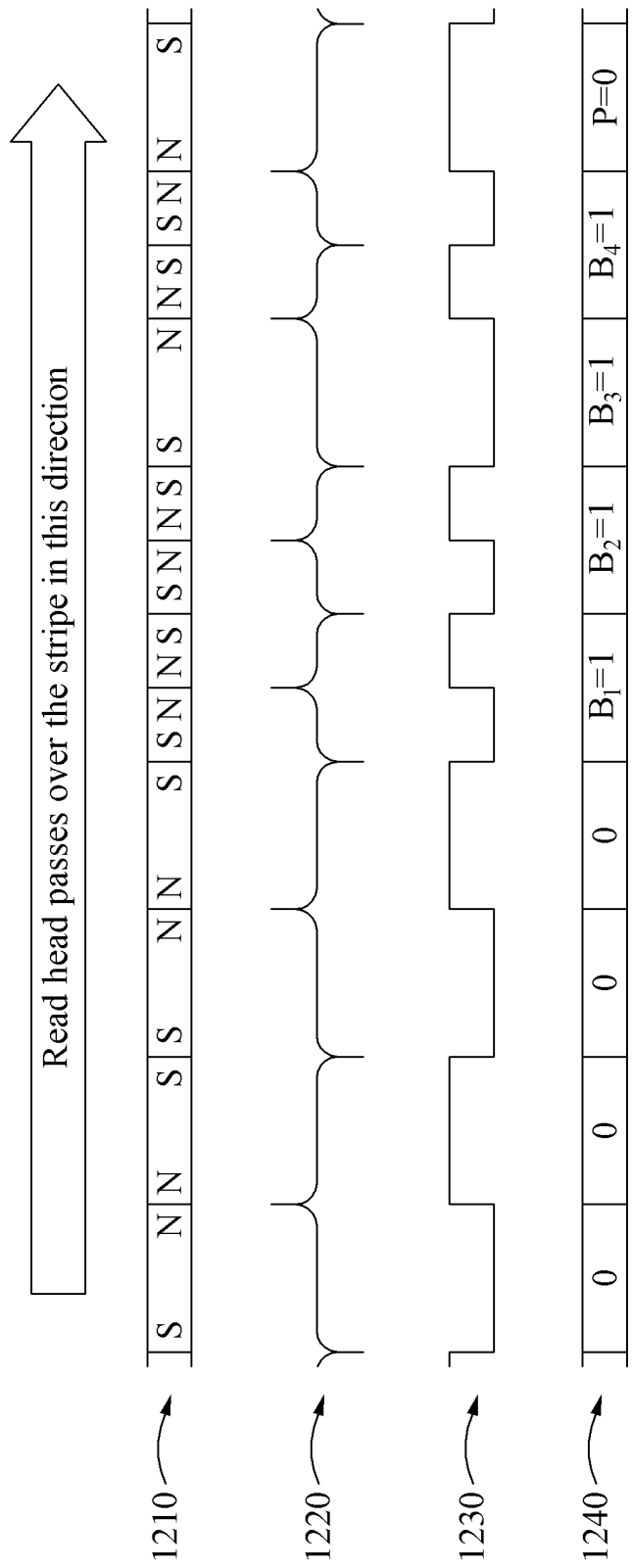
FIG. 12 illustrates a magnetic stripe simulated by a magnetic field conversion device according to an example embodiment.

FIG. 12 illustrates a magnetic stripe simulated by a magnetic field conversion device according to an example embodiment.

A processor according to an example embodiment may convert a token number included in token information to track data of a credit card, and may convert the track data to a series of binary values. For example, the processor may convert the token number of FIG. 6 including "36" values to track 2 data of a magnetic credit card and may convert the track 2 data to binary numbers.

Track data may refer to information encoded and stored in two tracks in a magnetic stripe on a back of a credit card (for example, a debit card, or a gift card). The magnetic stripe on the back of the credit card may contain three tracks. Track 2 may be 75 bits per inch (bpi) and may hold "40" 4-bit plus parity bit characters. However, the track 2 is merely an example, and a format of track data is not limited thereto.

For example, in a magnetic stripe formed on one surface of a physical credit card, an N pole and an S pole of a magnet may be alternately disposed. A head signal 1220 read by a magnetic card signal may include an impulse waveform for each magnet of each polarity. A pulse waveform 1230 may be obtained based on the head signal 1220. A binary signal 1240 may be decoded from the pulse waveform 1230.

As shown in FIG. 12, in an interval between alternate arrangements of magnetic polarities within a period corresponding to each slot, an interval in a case of indicating a bit value "1" may be less than an interval in a case of indicating a bit value "0". For example, the interval in the case of indicating the bit value "1" may be half of the interval in the case of indicating the bit value "0".

Figure 13:
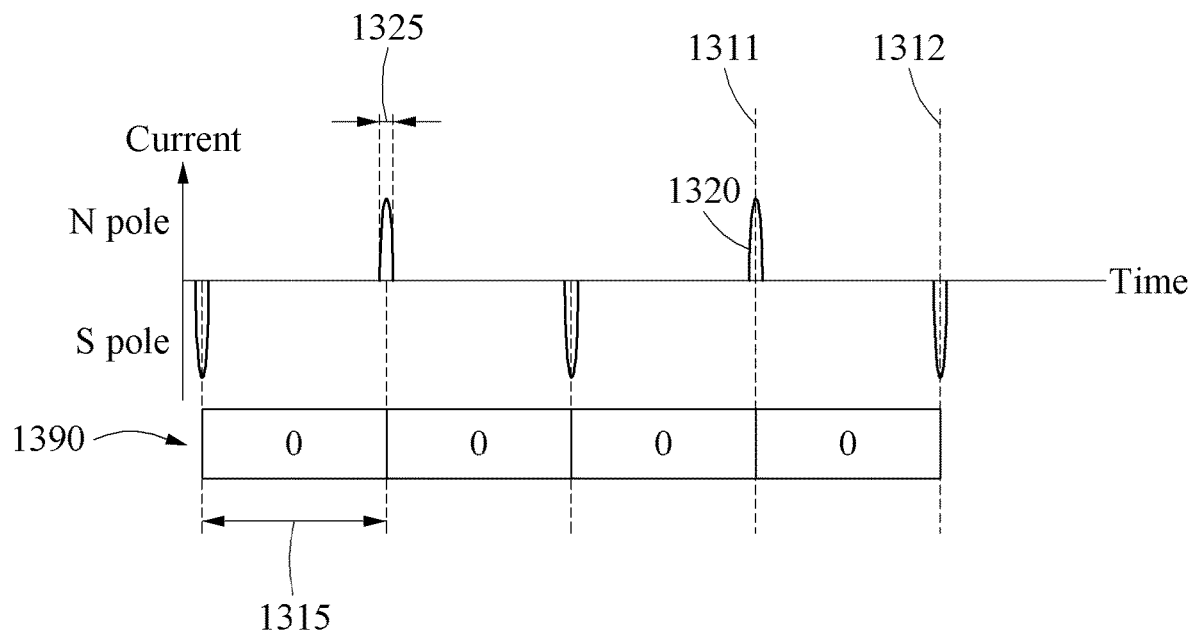
FIG. 13 illustrates a current signal applied to a magnetic field outputter to express a first bit value according to an example embodiment.
Figure 14:
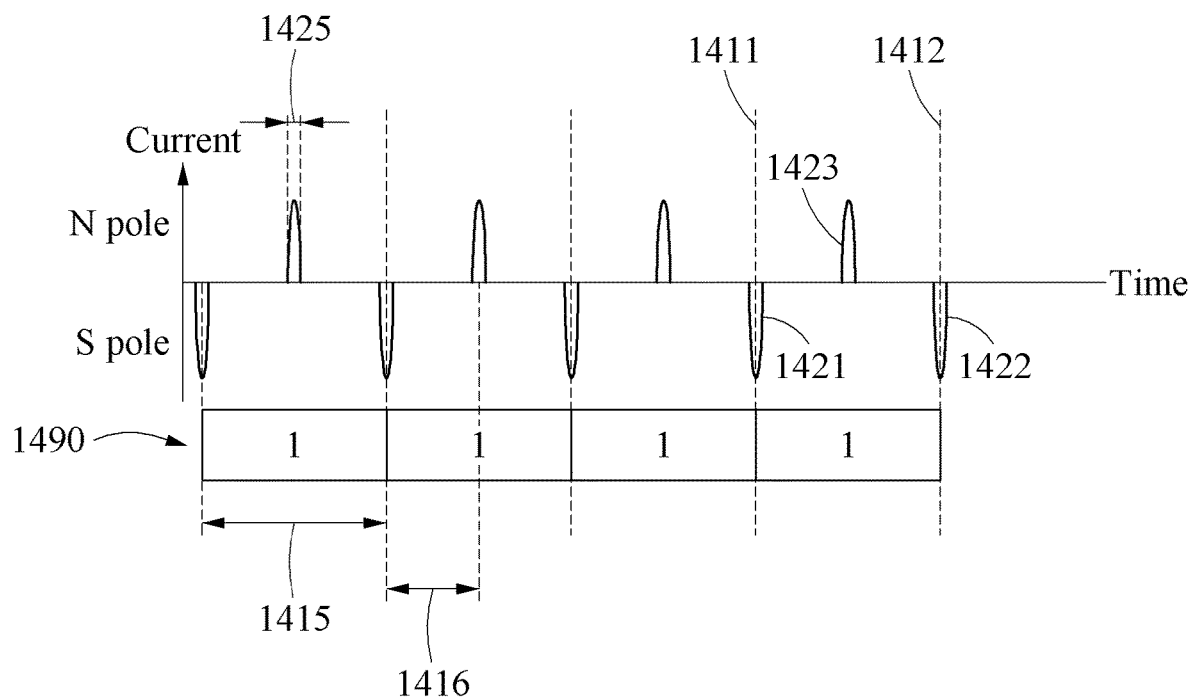
FIG. 14 illustrates a current signal applied to a magnetic field outputter to express a second bit value according to an example embodiment.

FIG. 13 illustrates a current signal applied to a magnetic field outputter to express a first bit value according to an example embodiment, and FIG. 14 illustrates a current signal applied to a magnetic field outputter to express a second bit value according to an example embodiment.

A power supply may provide a current pulse 1320 to a coil at a first pulse interval 1315 with respect to a first bit value 1390 (for example, a bit value "0"). For example, as shown in FIG. 13, the power supply may apply current pulses 1320 of opposite current directions to the coil at a start time 1311 and an end time 1312 of a period corresponding to the first bit value 1390, and may disable a current pulse during a period between the start time 1311 and the end time 1312. In other words, the power supply may apply a current pulse in a first current direction during a pulse width 1325. After a first pulse interval 1315 elapses, the power supply may apply a current pulse in a second current direction during the pulse width 1325. The first pulse interval 1315 may be greater than or equal to 20 times the pulse width 1325. For example, the pulse width 1325 may be 10 microseconds (μs), and the first pulse interval may be greater than or equal to 200 ns and less than or equal to 300 μs.

Also, the power supply may provide current pulses 1421, 1422 and 1423 to the coil at a second pulse interval 1416 with respect to a second bit value 1490 (for example, a bit value "1"). The second pulse interval 1416 may be half of a first pulse interval 1415. As shown in FIG. 14, the power supply may apply the current pulses 1421 and 1422 in a first current direction to the coil at a start time 1411 and an end time 1412 of a period corresponding to the second bit value 1490, and may apply the current pulse 1423 in a second current direction opposite to the first current direction during a period between the start time 1411 and the end time 1412.

When a pulse interval of a current pulse supplied to the coil is extremely narrow, orientation of a magnetic field may increase, but a decryption recognition rate of a magnetic card reader may decrease. When the pulse interval is extremely wide, the orientation of the magnetic field may decrease, but the decryption recognition rate of the magnetic card reader may increase.

A pulse width 1425 of a current pulse may be less than a pulse interval. The second pulse interval 1416 may be greater than or equal to ten times the pulse width 1425. Since a period in which a pulse is not applied is longer than a period in which a pulse is applied, current consumption may be minimized. For example, the pulse width 1425 may be 10 microseconds (μs), and the second pulse interval 1416 may be greater than or equal to 100 μs and less than or equal to 150 μs. Under the second pulse interval 1416 greater than or equal to 100 μs and less than or equal to 150 μs, intensity and orientation of a magnetic field and a decryption recognition rate of a magnetic card reader may be optimized.

A pulse waveform may include, but is not limited to, for example, a sinusoidal waveform, and another waveform may be used. During a period corresponding to a pulse width, current may be applied. During the other periods, current supplied to the coil may be blocked.

Thus, a magnetic field conversion device may simulate a change in a magnetic field based on a swipe of a magnetic stripe of a magnetic card as shown in FIG. 12, by setting a pulse interval based on a bit value while alternately changing a direction of current applied to the coil as shown in FIGS. 13 and 14.

Figure 15:
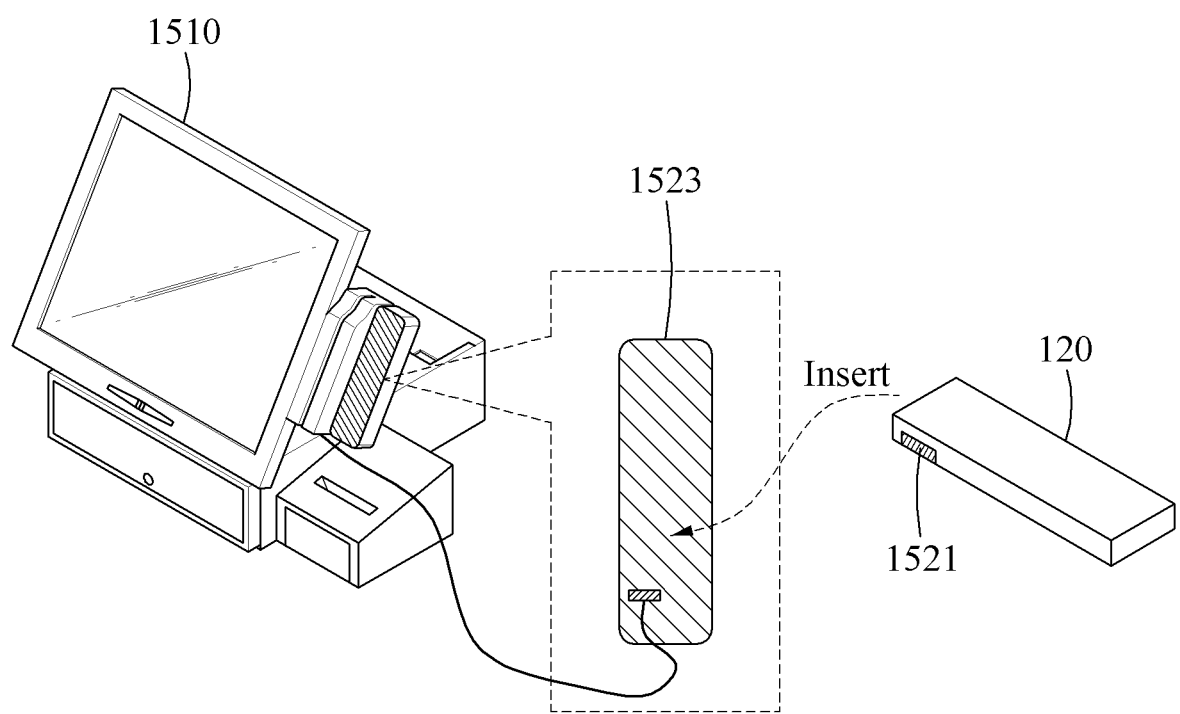
FIG. 15 illustrates an example in which a magnetic field conversion device is attached to a merchant terminal according to an example embodiment.
Figure 16A:
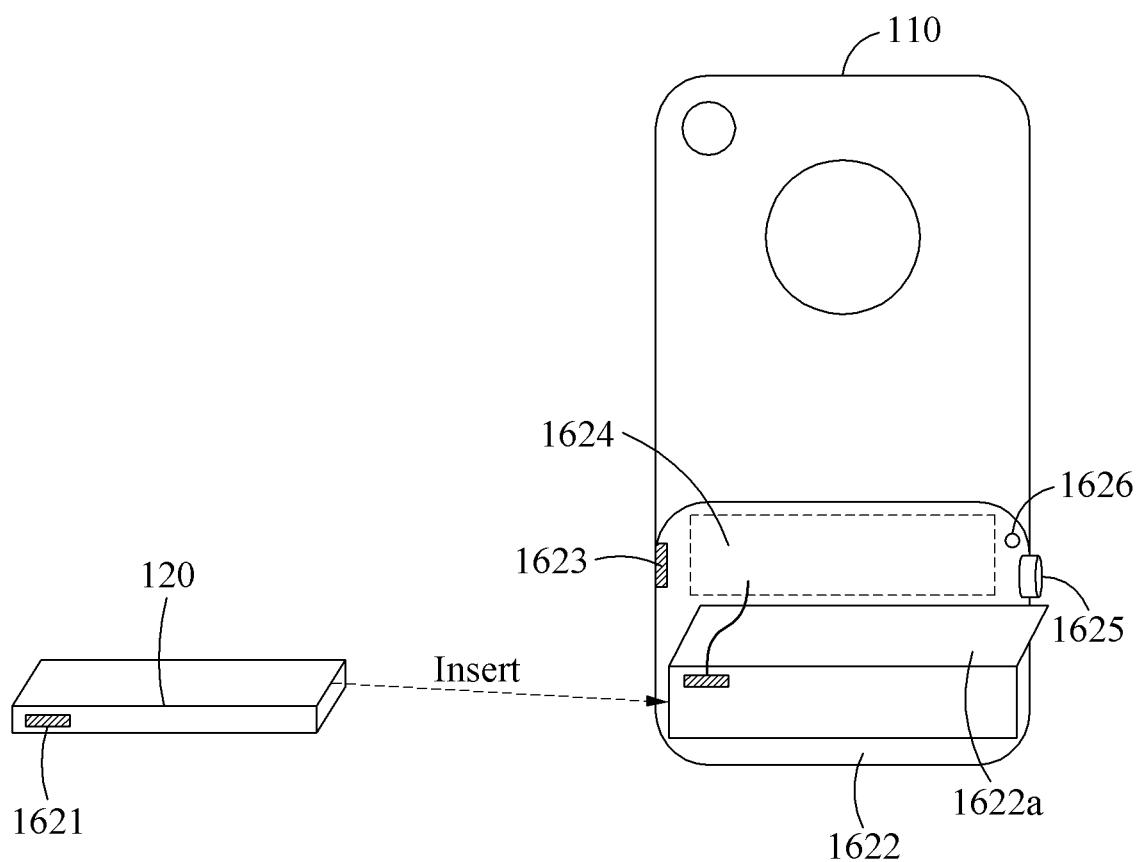
FIGS. 16A through 16C illustrate examples in which a magnetic field conversion device is attached to a mobile terminal according to an example embodiment
Figure 16B:
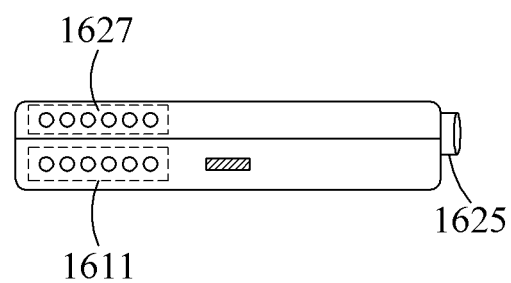
Figure 16C:
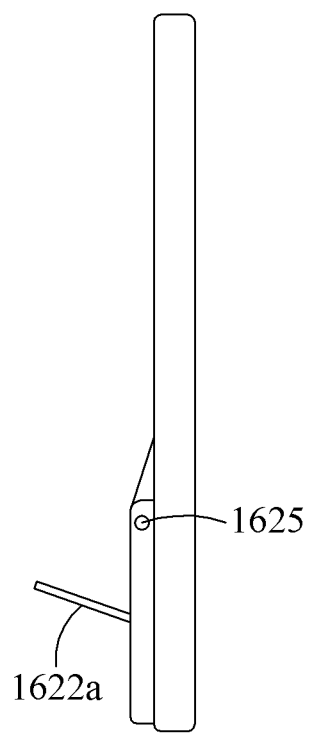

FIG. 15 illustrates an example in which a magnetic field conversion device is attached to a merchant terminal according to an example embodiment. FIGS. 16A through 16C illustrate examples in which a magnetic field conversion device is attached to a mobile terminal according to an example embodiment.

A magnetic field conversion device according to an example embodiment may be attached to at least one of a merchant terminal and a mobile terminal.

For example, as shown in FIG. 15, a magnetic field conversion device 120 may be attached to a merchant terminal 1510. The magnetic field conversion device 120 may be accommodated in a housing 1523, and may receive a power supply from the merchant terminal 1510 using a power source 1521. The housing 1523 may be formed of, for example, a wire mesh. The magnetic field conversion device 120 may be attached to the merchant terminal 1510 using a double-sided tape.

Also, as shown in FIGS. 16A through 16C, a magnetic field conversion device 120 may be attached to a mobile terminal. FIGS. 16A, 16B and 16C illustrate a rear surface, a bottom surface, and a side surface of the mobile terminal to which the magnetic field conversion device 120 is attached, respectively. The magnetic field conversion device 120 may be accommodated in a housing 1622, and the housing 1622 may be attached to the mobile terminal. The magnetic field conversion device 120 may receive a power supply from a battery 1624 using a power source 1621. A battery charger 1623 may charge the battery 1624. In the housing 1622, an on/off button 1625 and a light emitting diode (LED) 1626 indicating a state may be formed. By the on/off button 1625, the magnetic field conversion device 120 may be operated. Also, the housing 1622 may include an openable lid 1622a. A sound wave receiver 1627 of the magnetic field conversion device 120 may be disposed adjacent to a speaker 1611 of the mobile terminal.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as floptical disks; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

The invention claimed is:

1. A mobile terminal comprising:
an inputter configured to receive a user input for selecting card information;
a communicator configured to receive a token number indicating a physical card from a card company server, when a token issuance corresponding to card information selected by the user input is approved;
a processor configured to generate token information including the token number and an identification code indicating a target service provider for identification of a service provider; and
a sound wave outputter configured to output a sound wave signal converted from the generated token information and to transfer the sound wave signal to a magnetic field conversion device.

2. The mobile terminal of claim 1, wherein the processor is configured to convert the token information to a sound wave signal based on a single data frame that includes a number of slots greater than or equal to a number count of the identification code and a number count of the token number.

3. The mobile terminal of claim 1, wherein in response to a volume level set in the sound wave outputter being less than or equal to a threshold volume level, the processor is configured to increase a volume level of the sound wave outputter to a target volume level.

4. The mobile terminal of claim 3, wherein the processor is configured to temporarily increase the volume level of the sound wave outputter to the target volume level and to restore the volume level of the sound wave outputter back to the original volume level.

5. The mobile terminal of claim 3, wherein the processor is configured to maintain the volume level of the sound wave outputter at the target volume level during a time length including a period from an output start time of the sound wave signal to an output end time of the sound wave signal.

6. The mobile terminal of claim 3, wherein in response to at least a portion of a sound band of a sound source being reproduced by the sound wave outputter overlapping a sound band assigned to the sound wave signal, the processor is configured to interrupt reproduction of the sound source.

7. The mobile terminal of claim 3, wherein in response to a sound band of a sound source being reproduced by the sound wave outputter not overlapping a sound band assigned to the sound wave signal, the processor is configured to allow the sound source to continue to be reproduced.

8. The mobile terminal of claim 3, wherein in response to the volume level being temporarily increased for output of the sound wave signal, the processor is configured to limit a display output of an interface related to a volume control.

9. The mobile terminal of claim 1, wherein
the processor is configured to obtain device setting information comprising a device setting code, device setting data, and an identification code that indicates a target service provider, and
the sound wave outputter is configured to output a sound wave signal converted from the device setting information to change device settings of the magnetic field conversion device.

10. The mobile terminal of claim 9, wherein the device setting data comprises a setting value for at least one of a waiting time, a token transmission interval, a token transmission time length, a sound wave reception distance, a sound outputter setting value, a magnetic field generation interval per bit, a preamble, and a test mode.

11. A magnetic field conversion device comprising:
a sound wave receiver configured to receive a sound wave signal to be output by a mobile terminal;
a processor configured to convert token information to a series of binary values, in response to the received sound wave signal comprising the token information and an identification code of the token information indicating a target service provider assigned to the magnetic field conversion device; and
a magnetic field outputter configured to generate a magnetic field signal in which a magnetic field direction is alternately changed, to perform payment based on the token information, in response to a supply of current corresponding to the series of binary values.

12. The magnetic field conversion device of claim 11, wherein the sound wave receiver is configured to receive a sound wave signal corresponding to the token information of a single data frame that includes a number of slots greater than or equal to a number count of the identification code and a number count of the token number.

13. The magnetic field conversion device of claim 11, wherein the processor is configured to convert a token number included in the token information to track data of a credit card and to convert the track data to the series of binary values.

14. The magnetic field conversion device of claim 11, further comprising:
a power supply configured to provide a current pulse to a coil of the magnetic field outputter while alternately changing a current direction,
wherein the magnetic field outputter comprises the coil comprising a ferrite core and a winding enclosing the ferrite core, and
wherein the coil is configured to generate a magnetic field signal of a magnetic field direction corresponding to the current direction in response to a supply of the current pulse.

15. The magnetic field conversion device of claim 14, wherein the power supply is configured to provide the current pulse to the coil at a first pulse interval with respect to a first bit value, and to provide the current pulse to the coil at a second pulse interval with respect to a second bit value.

16. The magnetic field conversion device of claim 15, wherein the second pulse interval is half of the first pulse interval.

17. The magnetic field conversion device of claim 15, wherein
the power supply is configured to apply current pulses of opposite current directions to the coil at a start time and an end time of a period corresponding to the first bit value, and to disable the current pulses during a period between the start time and the end time, and
the power supply is configured to apply a current pulse of a first current direction to the coil at a start time and an end time of a period corresponding to the second bit value, and to apply a current pulse of a second current direction opposite to the first current direction during a period between the start time and the end time.

18. The magnetic field conversion device of claim 14, wherein a pulse width of the current pulse is less than a pulse interval.

19. The magnetic field conversion device of claim 11, wherein the magnetic field conversion device is attachable to at least one of a merchant terminal and the mobile terminal.

20. The magnetic field conversion device of claim 11, wherein in response to a device setting code being identified from the received sound wave signal, the processor is configured to extract device setting data from the sound wave signal and to change device settings of the magnetic field conversion device.

* * * * *